US011316370B2

(12) United States Patent
Poirier et al.

(10) Patent No.: US 11,316,370 B2
(45) Date of Patent: Apr. 26, 2022

(54) INDUCTIVE RECHARGEABLE ROLLER SHADE OR SCREEN SYSTEM

(71) Applicant: U.S. Screen Corporation, Austin, TX (US)

(72) Inventors: Dan Poirier, Austin, TX (US); Ryan Gustafson, Austin, TX (US)

(73) Assignee: U.S. SCREEN CORPORATION, Austin, TX (US)

( * ) Notice: Subject to any disclaimer, the term of this patent is extended or adjusted under 35 U.S.C. 154(b) by 68 days.

(21) Appl. No.: 16/641,138

(22) PCT Filed: Aug. 28, 2018

(86) PCT No.: PCT/IB2018/056540
§ 371 (c)(1),
(2) Date: Feb. 21, 2020

(87) PCT Pub. No.: WO2019/043565
PCT Pub. Date: Mar. 7, 2019

(65) Prior Publication Data
US 2020/0185965 A1 Jun. 11, 2020

Related U.S. Application Data

(60) Provisional application No. 62/552,884, filed on Aug. 31, 2017.

(51) Int. Cl.
*H02J 50/10* (2016.01)
*H02J 50/27* (2016.01)
(Continued)

(52) U.S. Cl.
CPC ............... *H02J 50/10* (2016.02); *E06B 9/72* (2013.01); *G03B 21/56* (2013.01); *H02J 7/02* (2013.01);
(Continued)

(58) Field of Classification Search
CPC .............. H02J 50/10; H02J 50/27; E06B 9/72
(Continued)

(56) References Cited

U.S. PATENT DOCUMENTS

2008/0250255 A1* 10/2008 Diab ........................ G06F 1/26
713/300
2012/0032631 A1* 2/2012 Bourilkov ............. H02J 7/0042
320/108

(Continued)

FOREIGN PATENT DOCUMENTS

KR WO2004077550 * 9/2004
WO 2004077550 9/2004

OTHER PUBLICATIONS

Dec. 26, 2018—International Search Report—PCT/IB2018/056540.

*Primary Examiner* — Richard V Muralidar
(74) *Attorney, Agent, or Firm* — Sprinkle IP Law Group

(57) ABSTRACT

This disclosure describes apparatuses and methods related to a rechargeable roller panel system. A rechargeable roller panel assembly may comprise a rechargeable control system that rotates a winding tube to wind and unwind a panel. An end cap is provided at a lateral end of the winding tube. The end cap comprises a magnetic break-away electrical connector exposed from the exterior of the end cap. An internal electrical connector is internally electrically connected to the magnetic break-away electrical connector. A recharge system electrical connector for the rechargeable control system is connected to the internal electrical connector such that the rechargeable control system may be recharged by an external recharging system connected via the magnetic break-away electrical connector. The roller panel system further includes a set of brackets to mount the end cap to a support structure and the roller panel assembly to the end cap.

27 Claims, 14 Drawing Sheets

(51) Int. Cl.
  *E06B 9/72* (2006.01)
  *G03B 21/56* (2006.01)
  *H02J 7/02* (2016.01)
  *H02J 7/35* (2006.01)
  *H04B 10/80* (2013.01)
  *H04L 12/10* (2006.01)

(52) U.S. Cl.
  CPC ................ *H02J 7/35* (2013.01); *H02J 50/27* (2016.02); *H04B 10/807* (2013.01); *H04L 12/10* (2013.01)

(58) Field of Classification Search
  USPC ........................................... 320/108
  See application file for complete search history.

(56) References Cited

U.S. PATENT DOCUMENTS

| | | | |
|---|---|---|---|
| 2014/0133019 A1* | 5/2014 | Mullet | E06B 9/42 359/461 |
| 2015/0374083 A1 | 12/2015 | Zon | |
| 2016/0190734 A1* | 6/2016 | Rohrbach | G06F 1/1633 439/39 |
| 2016/0260755 A1 | 9/2016 | Davids et al. | |
| 2018/0202224 A1* | 7/2018 | Kumar | H02S 40/32 |

\* cited by examiner

INDUCTIVE RECHARGEABLE ROLLER SHADE OR SCREEN SYSTEM

CROSS REFERENCE TO RELATED APPLICATIONS

This application is a 371 of International Application No. PCT/IB2018/056540 which was filed on Aug. 28, 2018, which also claims priority and the benefits of the earlier filed Provisional U.S. Application No. 62/552,884, filed Aug. 31, 2017, which is incorporated by reference for all purposes into this specification.

TECHNICAL FIELD

This disclosure relates to roller shade and/or roller screen systems. More specifically, this disclosure relates to an inductive, rechargeable roller shade and/or roller screen systems.

BACKGROUND ART

Roller shades, also known as roller blinds, are common forms of window coverings used in both residential and commercial applications. Most roller shades utilize a winding tube retained within a frame or housing. The winding tube has wound on it a shade or window covering that rolls up upon itself as the winding tube rotates in one direction and rolls down to cover the desired portion of the window when the winding tube rotates in the opposite direction.

Motorized roller shade systems include an electric motor coupled to the winding tube.

The motor may be located inside or outside the winding tube and is connected to a simple switch, or, in some implementations, to a radio frequency (RF) or infrared (IR) transceiver that controls the activation of the motor and the rotation of the shade tube.

In some implementations, the motor is powered by a battery pack arranged in the winding tube. Unfortunately, the set up and replacement of the batteries is cumbersome because it is generally necessary to disassemble the entire system to change the batteries. To address this problem, some motorized roller shade systems employ rechargeable battery packs. For example, the WIREFREE R28 from SOMFY SYSTEM INC. of Dayton, N.J. can be powered by a WIREFREE SOLAR PACK rechargeable battery inserted at the opposite end of the winding tube from the motor. The rechargeable battery pack, however, has wires that extend out of the cassette so the battery can be connected to a recharging source. When the battery is not hooked up to the charging method, the wires must be managed to prevent them from dangling unaesthetically out of the roller shade cassette.

Roller screens that provide TV screens for use in some types of projection TV systems are very similar to roller shades from a mechanical standpoint and are used in both residential and commercial applications. Most roller screens utilize a winding tube retained within a frame or housing. The winding tube has wound on it a projection screen that rolls up upon itself as the winding tube rotates in one direction and rolls down to display the screen when the winding tube rotates in the opposite direction.

Motorized roller screen systems include an electric motor coupled to the winding tube.

The motor may be located inside or outside the winding tube and is connected to a simple switch, or, in some implementations, to a radio frequency (RF) or infrared (IR) transceiver that controls the activation of the motor and the rotation of the screen tube.

In some implementations, the motor is powered by a battery pack arranged in the frame. Unfortunately, the set up and replacement of the batteries is cumbersome as in the roller shade systems because it is generally necessary to disassemble the entire system to change the batteries.

For both the roller shade and/or the roller screen systems, easily and conveniently recharging batteries is very important to make the overall systems easier to operate and able to be used in more locations. One or more embodiments of the disclosed invention provide an inductive, rechargeable battery to the roller shade and/or roller screen system. Embodiments of the disclosed invention have numerous advantages over the prior art that include these features: cost reduction, ease of charging, and placing the roller shade and/or roller screen systems in more locations.

SUMMARY OF INVENTION

This disclosure describes an apparatus and method of an embodiment of an invention that is an inductive, rechargeable roller shade and/or roller screen system. This embodiment of the apparatus/system includes a movable panel that can be wound around a winding tube where the movable panel is a roller shade or a roller screen; one or more end cap assemblies that couple to the winding tube; a control system that includes a rechargeable battery and motor; and one more inductive charging connectors that couple to the control system and the rechargeable battery that inductively couple to one or more inductive recharging sources to provide power to recharge the rechargeable battery.

The above embodiment of the invention may include one or more of these additional embodiments that may be combined in any and all combinations with the above embodiment. One embodiment of the invention describes where the inductive charging connectors are one or more magnetic, inductive connectors and the inductive recharging sources are one or more magnetic breakaway cables connected to one or more power sources. One embodiment of the invention describes where the inductive charging connectors are one or more PoE PD connectors and the inductive recharging sources are one or more PoE PSE devices. One embodiment of the invention describes where the inductive charging connectors are one or more rectennas and the inductive recharging sources are one or more RF transmitters. One embodiment of the invention describes where the inductive charging connectors are one or more nantennas and the inductive recharging sources are one or more optical transmitters. One embodiment of the invention describes where the inductive charging connectors are one or more solar cells and the inductive recharging source is solar power. One embodiment of the invention describes where the inductive rechargeable roller shade and/or roller screen system can act as a power source to another inductive rechargeable roller shade and/or roller screen system.

In addition, this disclosure describes an apparatus and method of an embodiment of an invention that is an inductive rechargeable roller shade and/or roller screen system. This embodiment of the apparatus/system includes a movable panel that can be wound around a winding tube where the movable panel is a roller shade or a roller screen; one or more end cap assemblies that couple to the winding tube; a means for system controlling that includes a rechargeable battery and motor; and one or more means for inductive charging that couple to the system control means and the rechargeable battery that inductively couple to one or more means for inductive recharging to provide power to recharge the rechargeable battery.

The above embodiment of the invention may include one or more of these additional embodiments that may be combined in any and all combinations with the above embodiment. One embodiment of the invention describes where the inductive charging means are one or more magnetic, inductive connectors and the inductive recharging means are one or more magnetic breakaway cables connected to one or more power sources. One embodiment of the invention describes where the inductive charging means are one or more PoE PD connectors and the inductive recharging means are one or more PoE PSE devices. One embodiment of the invention describes where the inductive charging means are one or more rectennas and the inductive recharging means are one or more RF transmitters. One embodiment of the invention describes where the inductive charging means are one or more nantennas and the inductive recharging means are one or more optical transmitters. One embodiment of the invention describes where the inductive charging means are one or more solar cells and the inductive recharging means is solar power. One embodiment of the invention describes where the inductive rechargeable roller shade and/or roller screen system can act as a power source to another inductive rechargeable roller shade and/or roller screen system.

The present disclosure further describes an apparatus and method of an embodiment of the invention as further described. Other and further aspects and features of the disclosure will be evident from reading the following detailed description of the embodiments, which should illustrate, not limit, the present disclosure.

BRIEF DESCRIPTION OF DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings.

DESCRIPTION OF EMBODIMENTS

Figure 1:
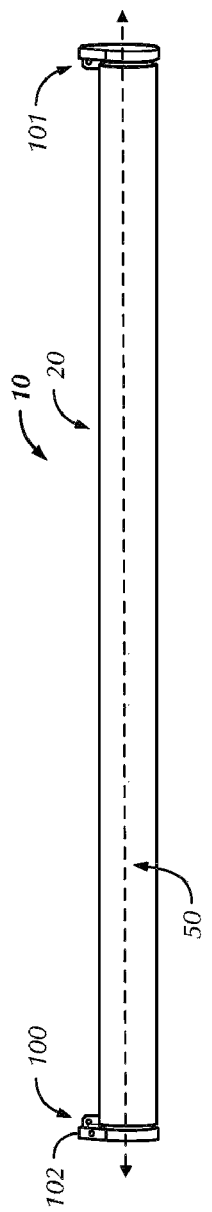
FIG. 1 is a diagrammatic representation depicting one embodiment of a motorized roller system with a breakaway magnetic charging point.

The disclosed embodiments should describe aspects of the disclosure in sufficient detail to enable a person of ordinary skill in the art to practice the invention. Other embodiments may be utilized and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. a person of ordinary skill in the art will recognize, however, that an embodiment may be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

In the following description, elements, circuits, and functions may be shown in block diagram form in order not to obscure the present disclosure in unnecessary detail. And block definitions and partitioning of logic between various blocks is exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths and the present disclosure may be implemented on any number of data signals including a single data signal.

The illustrative functional units include logical blocks, modules, and circuits described in the embodiments disclosed in this disclosure to more particularly emphasize their implementation independence. The functional units may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software or programs such as computer readable instructions that may be described in terms of a process that may be depicted as a flowchart, a flow diagram, a structure diagram, or a block diagram. The process may describe operational acts as a sequential process; many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, among different programs, and across several memory devices. Similarly, operational data may be identified and illustrated in this disclosure within modules, and may be embodied in any suitable form and organized within any suitable data structure. The operational data may be collected as a single data set, or may be distributed over different locations including over different storage devices.

Elements described in this disclosure may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in FIG. 1 are designated with a format of 1xx, where 1 indicates FIG. 1 and xx designates the unique element.

It should be understood that any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to first and second element does not mean that only two elements may be employed or that the first element must precede the second element. In addition, unless stated otherwise, a set of elements may comprise one or more elements.

Reference throughout this specification to "one embodiment", "an embodiment" or similar language means that a particular feature, structure, or characteristic described in the embodiment is included in at least one embodiment of the present invention. Appearances of the phrases "one embodiment", "an embodiment" and similar language throughout this specification may, but do not necessarily, all refer to the same embodiment.

In the following detailed description, reference is made to the illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system, but are merely idealized representations employed to describe embodiments of the present disclosure. And the illustrations presented are not necessarily drawn to scale. And, elements common between drawings may retain the same or have similar numerical designations.

It will also be appreciated that one or more of the elements depicted in the drawings/figures can also be implemented in a more separated or integrated manner, or even removed or rendered as inoperable in certain cases, as is useful in accordance with a particular application. And any signal arrows in the drawings/figures should be considered only as exemplary, and not limiting, unless otherwise specifically noted. The scope of the present disclosure should be determined by the following claims and their legal equivalents.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

To aid any Patent Office and any readers of any patent issued on this disclosure in interpreting the included claims, the Applicant(s) wish to note they do not intend any of the appended claims or claim elements to invoke 35 U.S.C. 112(f) unless the words "means for" or "step for" are explicitly used in the particular claim.

Embodiments may use various forms of electrical connectors. A magnetic breakaway connector can make it easy for a user to reach up and connect a recharge device (cable, wand or other device) to the recharge connector to recharge the system. Some embodiments may employ RF wireless charging and sharing, such as inductive charging using rectenna, sharing and/or solar panels, cells, nantenna, quantum dot cells, storage and harvesting.

The term "inductive charging" (also known as wireless charging or cordless charging) is used in this disclosure in the context of its broadest definition. "Inductive charging" may refer to using an electromagnetic field to transfer energy between two objects through electromagnetic induction, that is usually done with a charging station. Energy or power is sent through an inductive coupling to an electrical device, which can then use that energy to charge batteries or run the device. A person of ordinary skill in the art will understand that there are a variety of ways to create circuits and systems capable of using inductive charging.

Embodiments described in the disclosure provided an inductive, rechargeable motorized roller shade and/or screen system that allows through-cassette charging without recharge wires that pass outside of the cassette when the system is not being recharged. The system may include multiple recharge connections so the system can be mounted in multiple orientations. One embodiment includes a breakaway magnetic recharge connection easily accessible from below or another angle.

According to one embodiment, a rechargeable motorized roller system provides charging through the housing or end caps and eliminates or reduces wires and, in particular, eliminates external wires extending from the motorized roller system. A small size and form factor may also be achieved by the arrangement of components.

Figure 2:
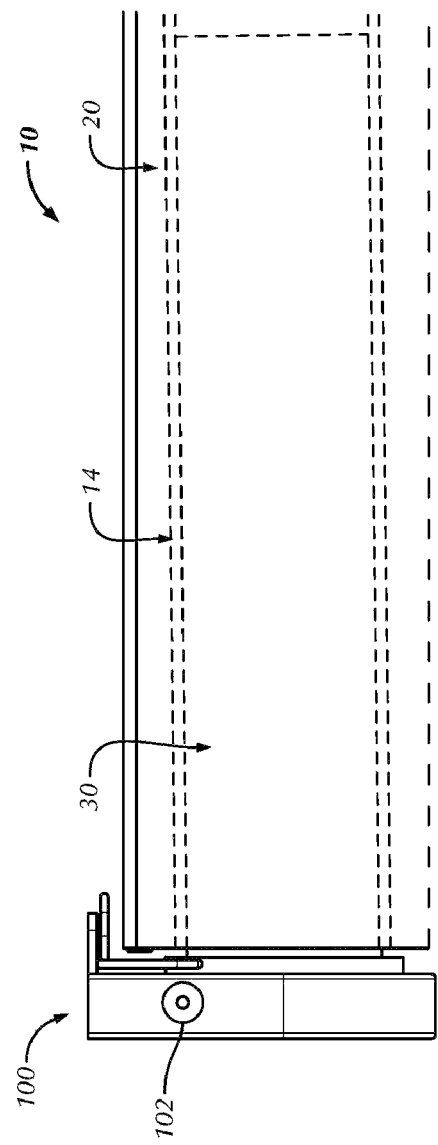
FIG. 2 is a diagrammatic representation depicting one embodiment of a motorized roller system with a breakaway magnetic charging point.

FIG. 1 and FIG. 2 are diagrammatic representations of one embodiment of an inductive, rechargeable motorized roller system 10. System 10 permits the motorized control of a movable panel 20 that can be wound around a winding tube 14 (FIG. 2). The panel may be adapted for any number of applications that can include a shade, such as a blind or sun screen, a screen for TV projection systems, or anything else now known or later developed that requires movable panel wound around a winding tube.

The motorized roller system 10 includes a motorized roller structure that includes a winding tube 14 coupled to panel 20 and a control system 30 for controlling the winding tube 14. The control system 30 can include an actuator, such as a DC motor, coupled to winding tube 14, and further includes a rechargeable power supply to power the actuator. Any suitable actuator and rechargeable power supply may be used. The control system 30 is preferably arranged partially or completely in the winding tube 14. For example, the control actuator may be inserted into the winding tube 14 at one of the ends of the system 10, where the power supply device may be inserted into the winding tube 14 at the other end. In another embodiment, the actuator and power supply device may be an integrated device inserted in one end of the winding tube 14. For example, the control system 30 may comprise a tubular rechargeable battery and motor from SOMFY or other provider. One non-limiting example of a control system is the SOMFY QT30 electronic tubular DC rechargeable battery and motor.

The actuator moves winding tube 14 in a known manner. The movable panel is hooked via one of the ends thereof onto the tube. Thus, the rotation of winding tube 14 drives, in one direction, the winding or unwinding panel 20 on the tube 14.

Figure 9:
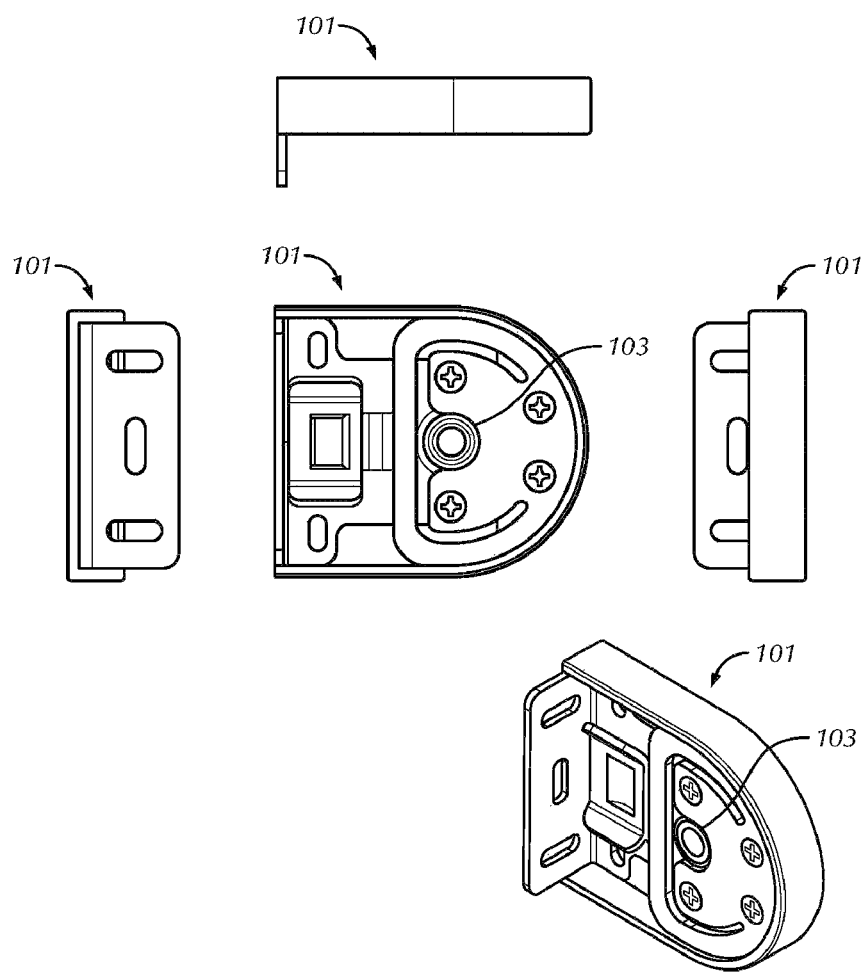
FIG. 9 illustrates examples of second end cap mounting assemblies with an idler bracket.

The system 10 further includes end cap mounting assemblies 100, 101 at either lateral end of the winding tube 14. These end cap mounting assemblies 100, 101 hold the motorized rolling structure on a fixed structure or support, for example a ceiling or a wall (not shown). The end cap assembly at the actuator end can include a feature against which the actuator can torque. The opposite end cap mounting assembly may include any connection to support the motorized roller structure and allow winding tube 14 to rotate. For example, the second end cap mounting assembly may include an idler. FIG. 9 provides an example embodiment illustrating this feature.

At least one of the end cap mounting assemblies 100, 101 include a recharge connector electrically coupled to the control system 30 for recharging the power supply. For example, end cap mounting assembly 100 may include a recharge connector 102 adapted to connect to a charging cable so the rechargeable power supply of control system 30 may be recharged. In some embodiments, the connector is flush with or inset from the radially outer surface of the end cap (in this context "radially" refers to outward relative to an axis 50 that includes and may extend from the axis about which the winding tube rotates to wind and unwind the panel 20, "laterally," refers to directions parallel to axis 50). In the arrangement illustrated, the end cap recharge connector 102 allows a recharge cable to be connected at a first end to system 10 through connection perpendicular to the axis 50. The recharge cable may be connected at a distal end to an AC power source, Power over Ethernet (PoE), solar panel, cell, nantenna, quantum dot cells, or with inductive rectenna or other source(s). Another embodiment for recharging with a PoE circuit is further described in FIG. 13. A person of ordinary skill in the art will understand that other embodiments can include an end cap assembly with recharge connections implemented at a non-actuator side end cap assembly.

Figure 3:
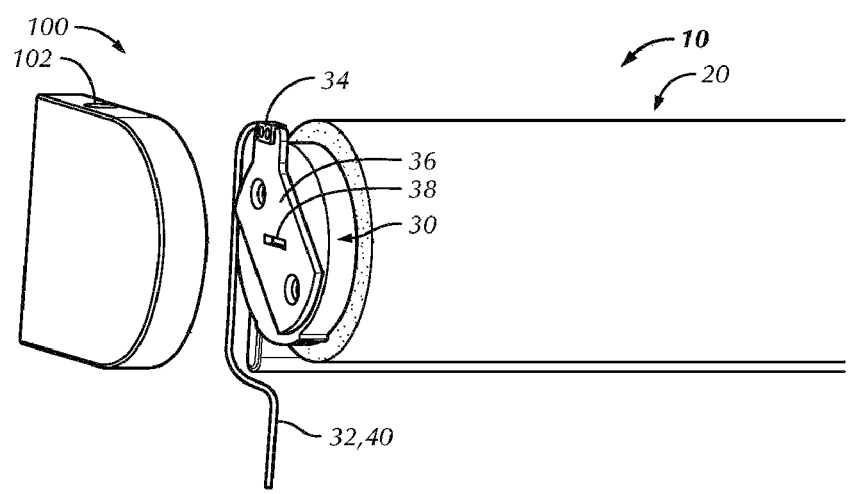
FIG. 3 depicts an embodiment of a motorized roller system with an end cap mounting assembly at least partially removed.
Figure 4:
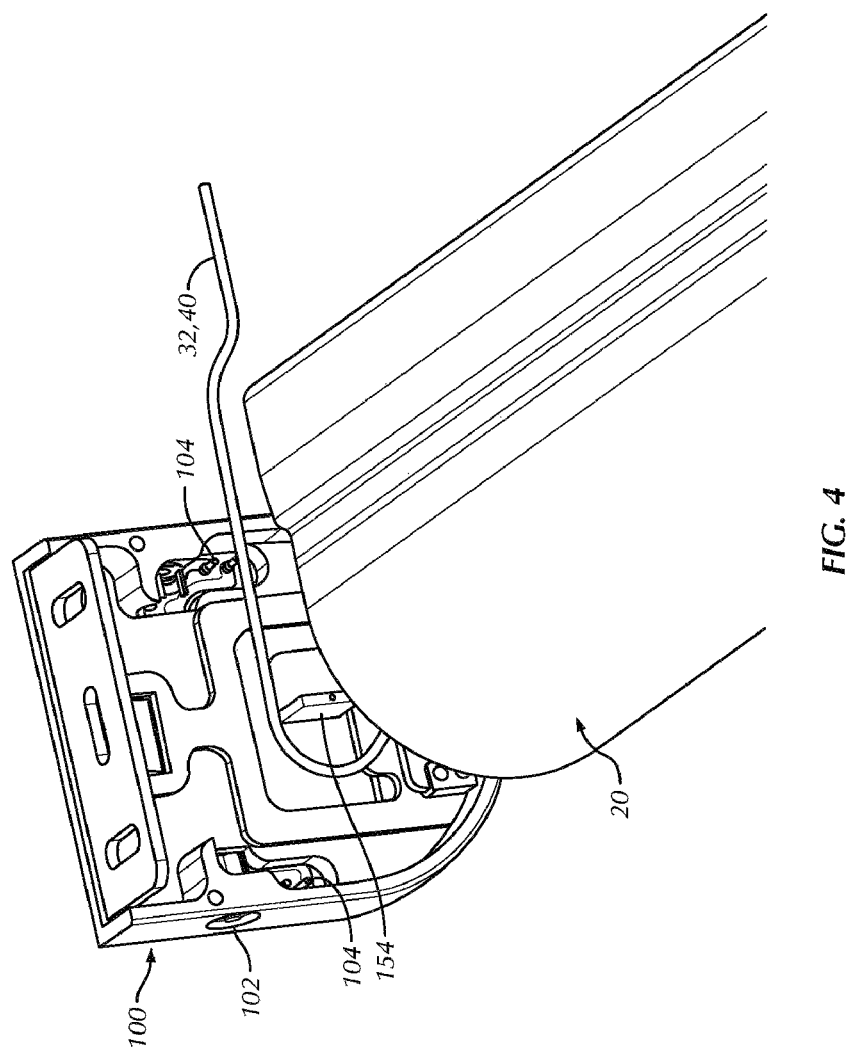
FIG. 4 depicts an embodiment of a motorized roller system with an end cap mounting assembly at least partially removed.

FIG. 3 and FIG. 4 are isometric views of one embodiment of system 10 with end cap mounting assembly 100 partially removed to expose the end of control system 30. The control system 30 may include an actuator and rechargeable power supply device. Other embodiments of control system 30 are further illustrated in FIG. 10 and FIG. 11. An antenna 32 couples to control system 30 that allows the control system to transmit and receive RF signals for remote control of the system. Commands could be, for example, unwind the shade or screen, wind the shade or screen, and/or stop the shade or screen. In one embodiment, antenna 32 is modified to act as a rectenna 40 for inductive charging from other inductive nodes (such as other/additional roller systems) and for transmission of inductive signaling for other nodes (such as other/additional roller systems).

A control system recharge connector 34 connects to leads for recharging the power supply (not shown) of control system 30. Connector 34 is adapted to connect with a complementary connection 104 in end cap mounting assembly 100 through lateral motion. In the illustrated embodiment, end cap mounting assembly 100 provides multiple connections 104 with which connector 34 can mate, depending on orientation. A person of ordinary skill in the art will appreciate that other connections and connectors are possible. In the illustrated embodiment, connector 104 includes a set of pins (e.g., +, − pins) that are received by connector 34. A person of ordinary skill in the art will appreciate that other types of connectors 34, 104 can be used. When end cap mounting assembly 100 is installed, recharge connector 102 is electrically connected to recharge connector 34 to create an electrical path from at least one recharge connector 102 to control system 30 for recharging the power supply of control system 30.

According to one embodiment, system 10 includes a bracket 36 that couples to the end of the motorized roller structure. In the embodiment illustrated, bracket 36 is fixed to the end of the control system 30 housing. Bracket 36 includes a connector holder, such as a notch or other feature, to hold connector 34 in a desired position so connector 34 can mate with a complementary electrical connector 104.

In the embodiment of FIG. 3 and FIG. 4, end cap mounting assembly 100 is an actuator mount assembly that supports the actuator portion of the control system (e.g., supports a control system with an integrated actuator and power supply and/or supports the actuator portion of a control system with separate actuator and battery portions for example). Mounting bracket 36 can include an opening 38 (e.g., a slot) to receive a projection 154 (e.g., a key) of end cap mounting assembly 100 against which the actuator of control system 30 can torque.

FIG. 4 illustrates an RF antenna 32 used for receiving radio frequency commands to the control processor 200 (see FIG. 10 and FIG. 11) that allow the user to control the motor. Another embodiment also uses RF antenna 32 to provide radiated frequencies to recharge other shade or screen control system 730 node(s) within range of the broadcast power signal.

Figure 12:
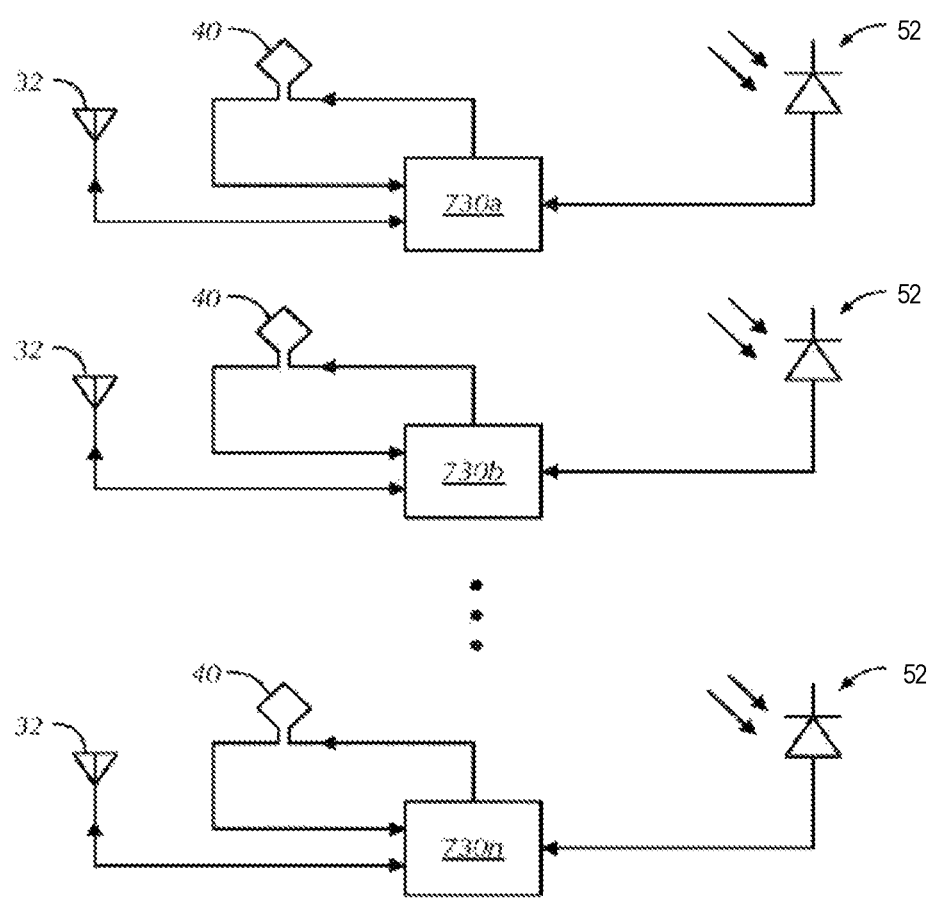
FIG. 12 illustrates a system block diagram for a plurality of nodes that harvests, stores, and transmit energy.

FIG. 3 illustrates a rectenna 40 that allows for inductive charging from a radiated source such as another shade or screen control system 730 node within range of the broadcast power signal. FIG. 12 illustrates an embodiment of multiple nodes being recharged in this manner.

Figure 5:
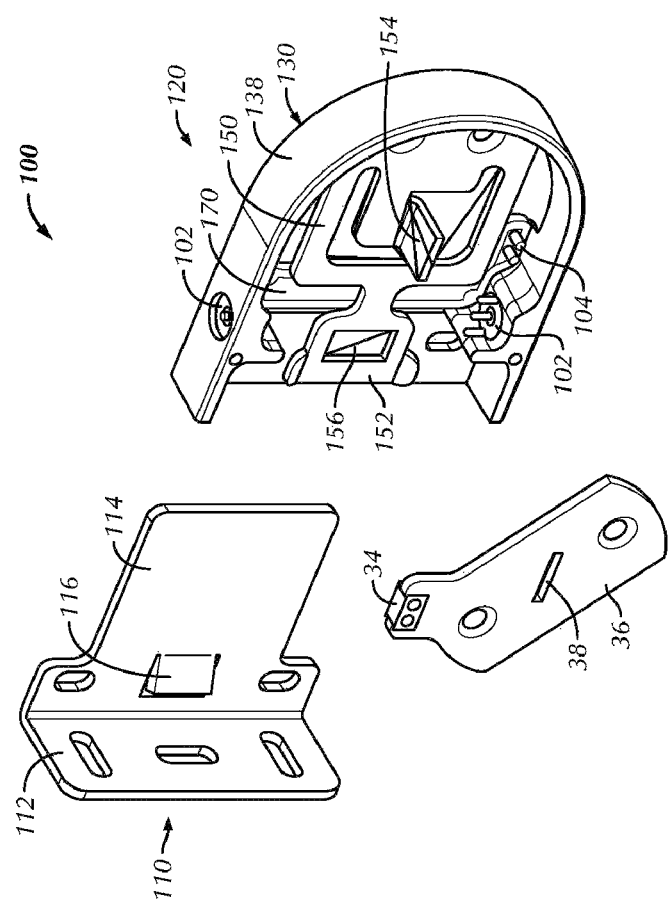
FIG. 5 depicts an exploded view of one embodiment of an end cap mounting assembly.
Figure 6:
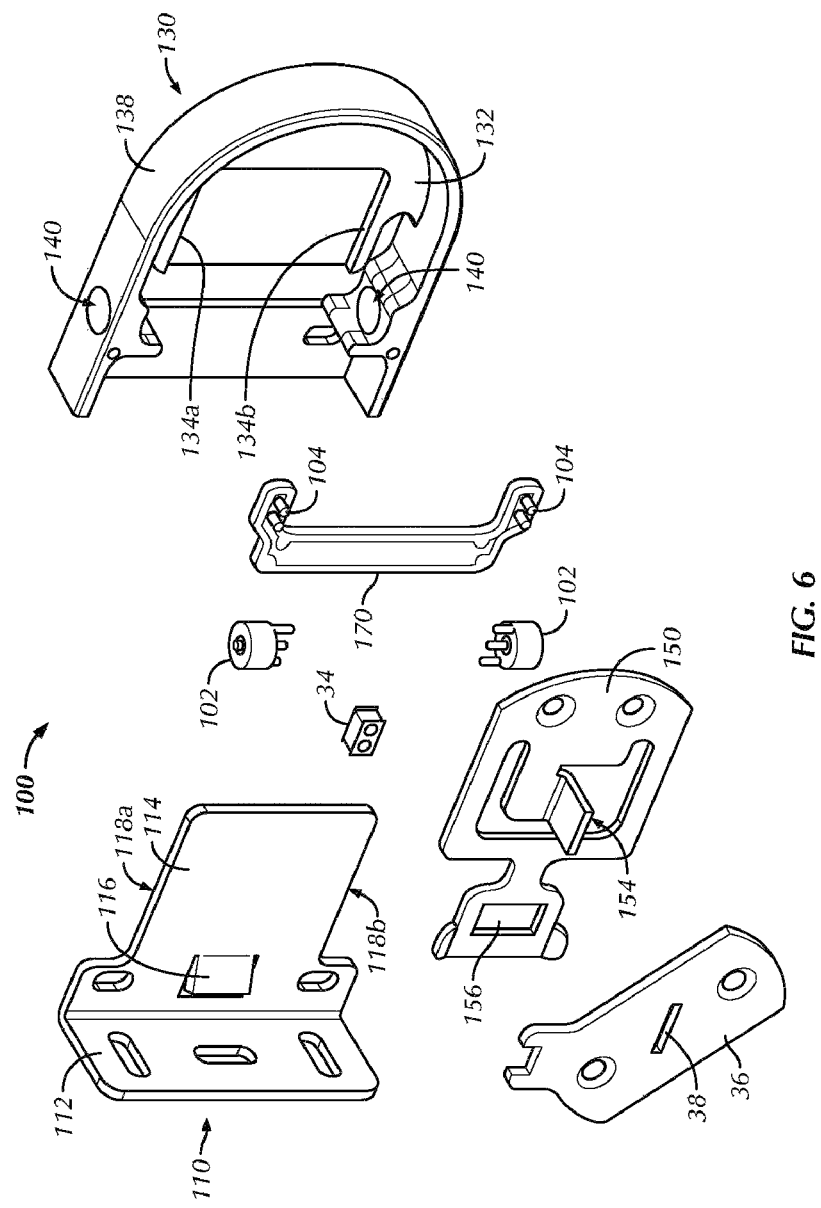
FIG. 6 depicts an exploded view of one embodiment of an end cap mounting assembly.

FIG. 5 illustrates a partially exploded view of one embodiment of end cap mounting assembly 100. The illustrated embodiment includes a mounting bracket 110, end cap 120 and bracket 36. FIG. 6 illustrates a further exploded view of one embodiment of end cap mounting assembly 100.

Mounting bracket 110 includes a base plate portion 112 having one side adapted to abut a preferably flat surface and a support plate portion 114 that projects from the opposite side. Base plate portion 112 has openings for receiving fasteners to secure mounting bracket 110 to a wall, ceiling, window casing or other structure. Support plate portion 114 acts as a support member that can be inserted into end cap 120 to support end cap 120.

End cap 120 includes first end cap bracket 130, second end cap bracket 150 and circuit board 170, which provides an electrical path between the recharge connector(s) 102 and the internal connector(s) 104. End cap bracket 130 includes a plate portion 132 and peripheral wall portion 138 extending perpendicular to the plate portion 132.

In one embodiment, end cap bracket 130 may be formed from aluminum or a similar metal, or molded from a plastic or similar type material and will have a generally smooth or aesthetic outer appearance. A person of ordinary skill in the art will appreciate that other materials may be used. The inner surface of plate portion 132 and/or wall portion 138 includes features to promote alignment of other portions of end cap mounting assembly 100 in end cap 120. Openings 140 through peripheral wall portion 138 are adapted to accommodate recharge connectors 102 so a charging cable can be connected to a recharge connector 102 through the opening 140 of the end cap assembly wall 138.

Circuit board 170 is disposed against plate portion 132. Standoffs may separate board 170 from plate portion 132. Circuit board 170 provides electrical paths from one or more recharge connectors 102 to one or more internal connectors 104 mounted to circuit board 170. In the embodiment illustrated, circuit board 170 has a generally "C" shape and connects a first internal connector 104 to a first recharge connector 102 and a second internal connector 104 to a second recharge connector 102. According to one embodiment, recharge connectors 102 are magnetic connectors to more easily allow a recharge cable to be used to couple to recharge connectors 102 for recharging. Internal connectors 104 are pin connectors that connect to the inside part of recharge connectors 102. A person of ordinary skill in the art will appreciate that other embodiments may use other forms of connectors.

The internal connectors 104 are positioned to allow connection to control system recharge connector 34 in a plurality of orientations (e.g., to allow the system 10 to be mounted with the actuator on the left side of the winding tube (left-hand mounting) or the right side of the winding tube (right-hand mounting). Recharge connectors 102 are positioned to allow an external recharge cable to be connected to recharge connectors 102 in a variety of orientations (e.g., to allow the system to be recharged in either left-hand mounting or right-hand mounting configurations). Preferably, recharge connectors 102 are mounted so they are flush with or inset from the outer surface of wall 138.

Second end cap bracket 150 is coupled to first end cap bracket 130 and includes an end portion 152 spaced from end cap bracket 130 and/or may flex laterally inward so end cap 120 can receive support plate portion 114 between first end cap bracket 130 and second end cap bracket 150. One face of bracket 150 may abut a face of support plate portion 114 when support plate portion 114 is inserted in end cap 120. Projection 154 projects from the opposite side of bracket 150 and can be received in an opening 38 (e.g., a slot) of bracket 36.

According to one embodiment, assembly 100 includes a releasable locking mechanism to lock mounting bracket 110 to end cap 120. In the illustrated embodiment, support plate portion 114 includes a locking tooth 116 and second end cap bracket 150 includes a corresponding opening 156 configured to receive locking tooth 116. As the support plate portion 114 is inserted between bracket 130 and bracket 150, end portion 152 of bracket 150 deflects away from bracket 130 until tooth 116 aligns with opening 156 at which point end portion 152 can snap back toward bracket 130 to lock end cap 120 to bracket 110. Support plate portion 114 can be unlocked from end cap 120 by prying end portion 152 or pressing locking tooth 116 with a tool, such as a flat head screwdriver.

When support plate portion 114 is inserted in end cap 120, a first face 118*a* abuts an adjacent face of a first support wall 134*a*, such as a rib, projecting inward from plate portion 132 and an opposite second face 118*b* abuts an adjacent face of a second support wall 134*b*. End cap 120, and hence system 10, is supported by a large surface area (e.g., the contact between the lower face of support wall 134*a* and upper face 118*a* of support portion 114 in the right-hand mounting orientation of [FIG. 5]).

Figure 7:
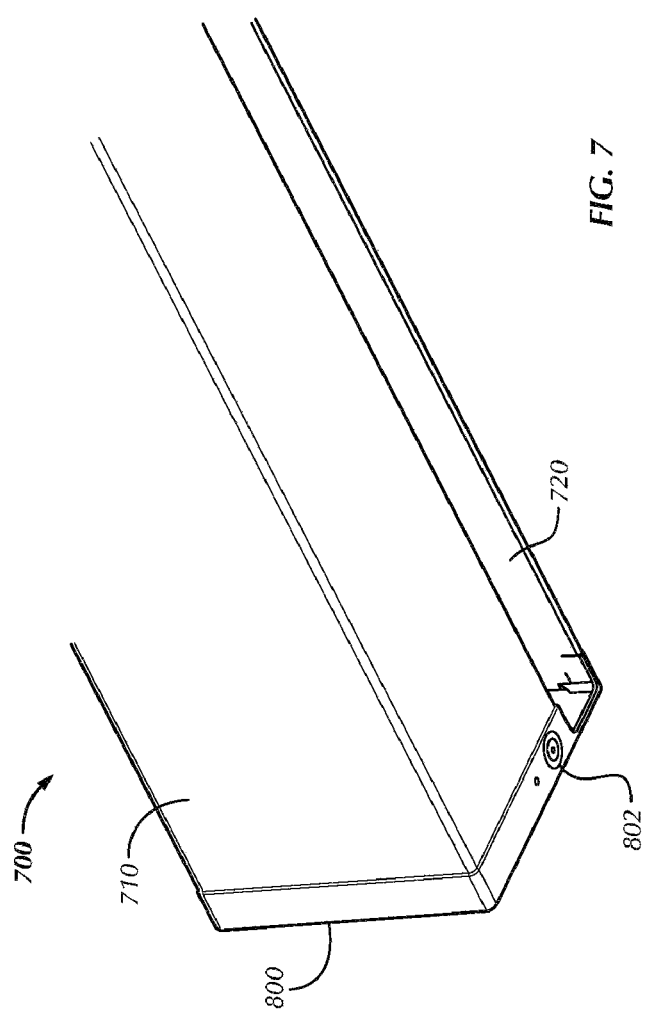
FIG. 7 depicts a view of another embodiment of a motorized roller system.

FIG. 7 is a diagrammatic representation of another embodiment of a cassette 700 containing a motorized roller structure having a winding tube coupled to a panel and a control system for controlling the winding tube to wind and unwind a panel (e.g., a shade, projection screen and/or other panel). The motorized roller structure may be similar to the motorized roller structures discussed elsewhere and may include a control system as discussed.

Cassette 700 comprises a housing 710 of one or more walls covering one or more sides of the motorized roller structure. In the embodiment illustrated, the cassette has a box shape with the housing 710 having 3-4 walls. In some embodiments, an uncovered side may face a support structure (wall, ceiling, window casing) or other structure. According to one embodiment, cassette housing 710 forms a slot 720 through which the panel can wind and unwind.

The cassette 700 further includes end cap mounting assemblies at each end adapted to mount the cassette 700 to a support structure (e.g., wall, ceiling, window casing). Although only one end cap mounting assembly 800 is illustrated, a person having ordinary skill in the art will appreciate that cassette 700 includes a second end cap mounting assembly at the other lateral end.

The end cap assemblies hold the motorized rolling structure on a fixed structure or support, for example a ceiling or a wall. The end cap assembly at the actuator end can include a feature against which the actuator can torque. The opposite end cap mounting assembly may include any connection to support the motorized roller structure and allow the winding tube to rotate. For example, the second end cap mounting assembly may comprise an idler.

At least one of the end cap mounting assemblies includes a recharge connector electrically coupled to the control system for recharging the power supply. For example, end cap mounting assembly 800 includes a recharge connector 802 adapted to connect to a charging cable so the rechargeable power supply of the control system may be recharged. In some embodiments, the connector is flush with or inset from an outer surface of the end cap. In the arrangement illustrated, the end cap recharge connector 802 allows a recharge cable to be connected at a first end to cassette 700 through coupling perpendicular to the long axis of cassette 700. The recharge cable may be connected at a distal end to an AC power source, and a plurality of recharging sources such as an external solar panel, cell, nantenna, quantum dot cells, or with inductive rectenna means and a magnetic break away connection, inductive rectenna, Power over Ethernet, or other sources.

Figure 8:
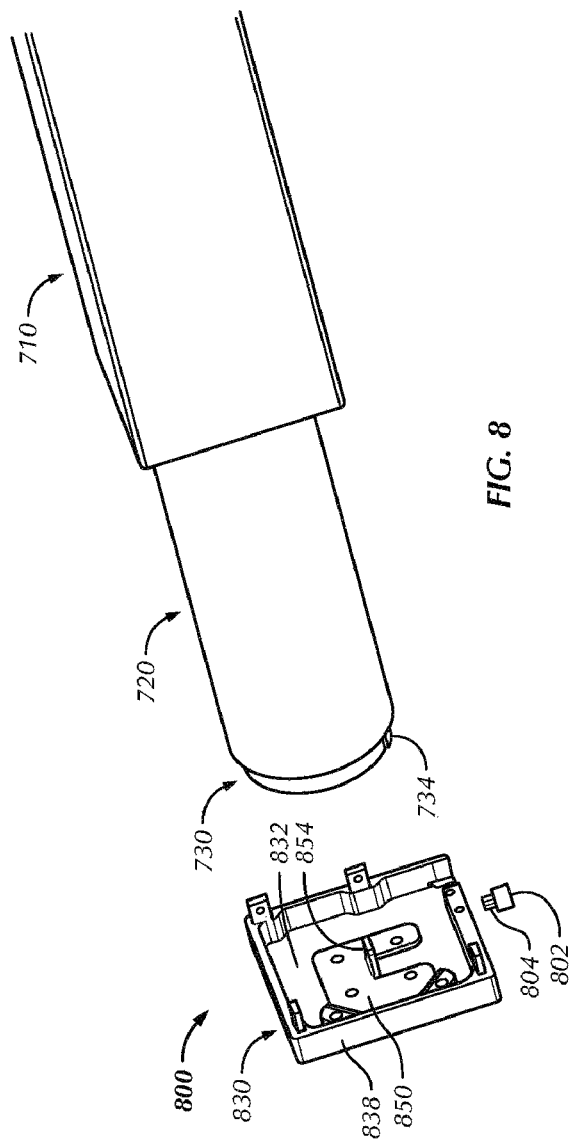
FIG. 8 depicts a view of another embodiment of a motorized roller system.

FIG. 8 is an exploded view of one embodiment of cassette 700 with end cap mounting assembly 800 partially removed to expose the end of a control system 730. The control system 730 may include an actuator, processor with memory storage, and rechargeable power supply device. Additional embodiments of the control system 730 are further illustrated in FIG. 10 and FIG. 11.

A control system recharge connector 734 couples to leads for recharging the power supply of control system 730. Connector 734 is adapted to connect with a complementary connector 804. In the illustrated embodiment, connector 804 comprises a set of pins received by connector 734, but other types of connectors 734, 804 can be used such as an RJ45 for use as a PD in PoE or with passive PoE at 24 vdc. When end plate assembly 800 is installed, recharge connector 802 is electrically connected to connector 734 to create an electrical path from at least one recharge connector 802 to control system 730 for recharging the power supply device of control system 730. According to one embodiment, recharge connectors 802 are magnetic connectors (e.g., a magnetic break-away connector) to more easily allow a recharge cable to be connected to recharge connectors 802 and internal connectors 804 are pin connectors. A person with ordinary skill in the art will appreciate that other embodiments may use other forms of connectors or radiators.

End cap mounting assembly 800 includes a first end cap bracket 830 and second end cap bracket 850. End cap bracket 830 includes a plate portion 832 and peripheral wall portion 838 extending perpendicular to the plate portion 832. End cap bracket 830 may be formed from aluminum or a similar metal, molded from a plastic, or similar type material and will have a generally smooth or aesthetic outer appearance. A person of ordinary skill in the art will appreciate that other materials may be used. The inner surface of plate portion 832 and/or peripheral wall portion 838 includes features to promote alignment of other portions of end cap assembly 800. One or more openings through peripheral wall portion 838 are adapted to accommodate one or more recharge connectors 802 so a charging cable can be connected to a recharge connector 802 through the end cap assembly peripheral wall portion 838. Preferably, recharge connectors 802 are mounted so they are flush with or inset from the outer surface of peripheral wall portion 838. One embodiment would include an RJ45 802 power over Ethernet as the power source for the motor control and for recharging methods previously described. This recharge connection may be connected to the power supply 220 working as a Power Device or PD for power over Ethernet and is controlled with the processor 200 for negotiation for voltage, wattage, class and signature type with a supplied Power Source Equipment (PSE) 910 from a connected PSE on the Ethernet connection 920.

Second end cap bracket 850 can be coupled to first end cap bracket 830 According to one embodiment. End cap bracket 850 includes a projection 854 projects laterally inward from bracket 850. Projection 854 may be received in a slot or opening and provide a structure against which the control system can torque against.

In another embodiment, the recharge connector 802 is contained in the housing 710 rather than the end cap to allow through box charging and is preferably flush with or inset from the outer surface of a wall of housing 710.

FIG. 9 Illustrates an embodiment of a second end cap mounting assembly 101 having an idler 103. The assembly 101 is shown from all perspectives including an isometric view to provide a complete view of this part.

Figure 10:
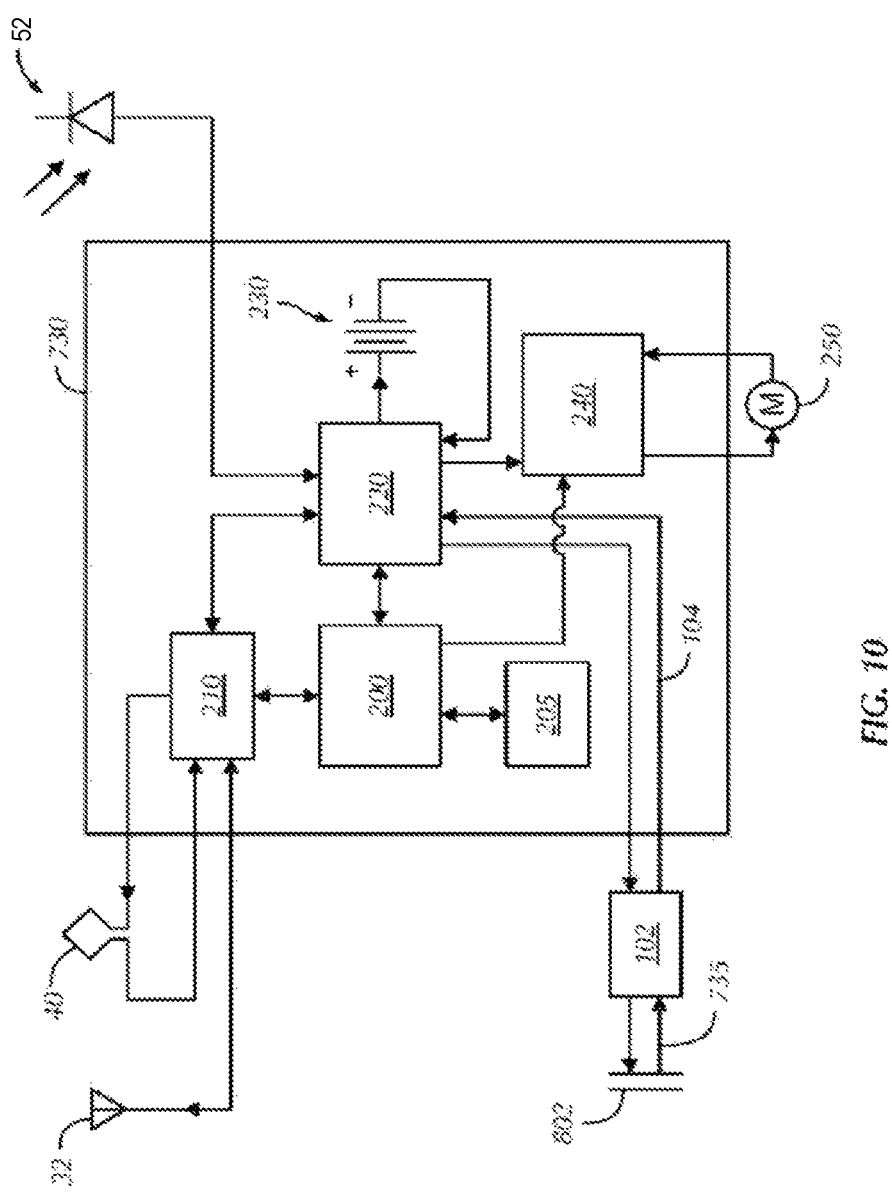
FIG. 10 illustrates a simplified block diagram of the recharging, storage and transmission for control and inductive charging and sharing.

FIG. 10 illustrates a simple block diagram of a control system 730 that includes a processor 200 connected to memory 205 and one or more RF transceiver(s) 210. FIG. 10 illustrates various types of inductive, rechargeable roller shade and/or screen systems. This embodiment illustrates a rechargeable power supply system that includes a local power storage battery 230 connected to one or more DC charging circuits 220. And motor control circuit 240 connects to a motor 250. One embodiment includes a magnetic, inductive break away connector 802 to provide power for recharging. Magnetic connector 802 couples to magnetic, an inductive charging connector 734 through inductive, magnetic connection 735 connects to charging circuit 220 through control system recharge leads 104. Another embodiment may include an inductive rectenna 40 to provide power for recharging. And another embodiment may include an inductive nantenna or other solar harvesting circuit 52 for providing power for recharging. Another embodiment allows for excess stored power to be transmitted via RF transceiver 210 out a single or plurality of sub GHz and GHz RF antenna(s) 32 to use as power supplies to other shade and/or screen nodes for inductive recharging.

Figure 11:
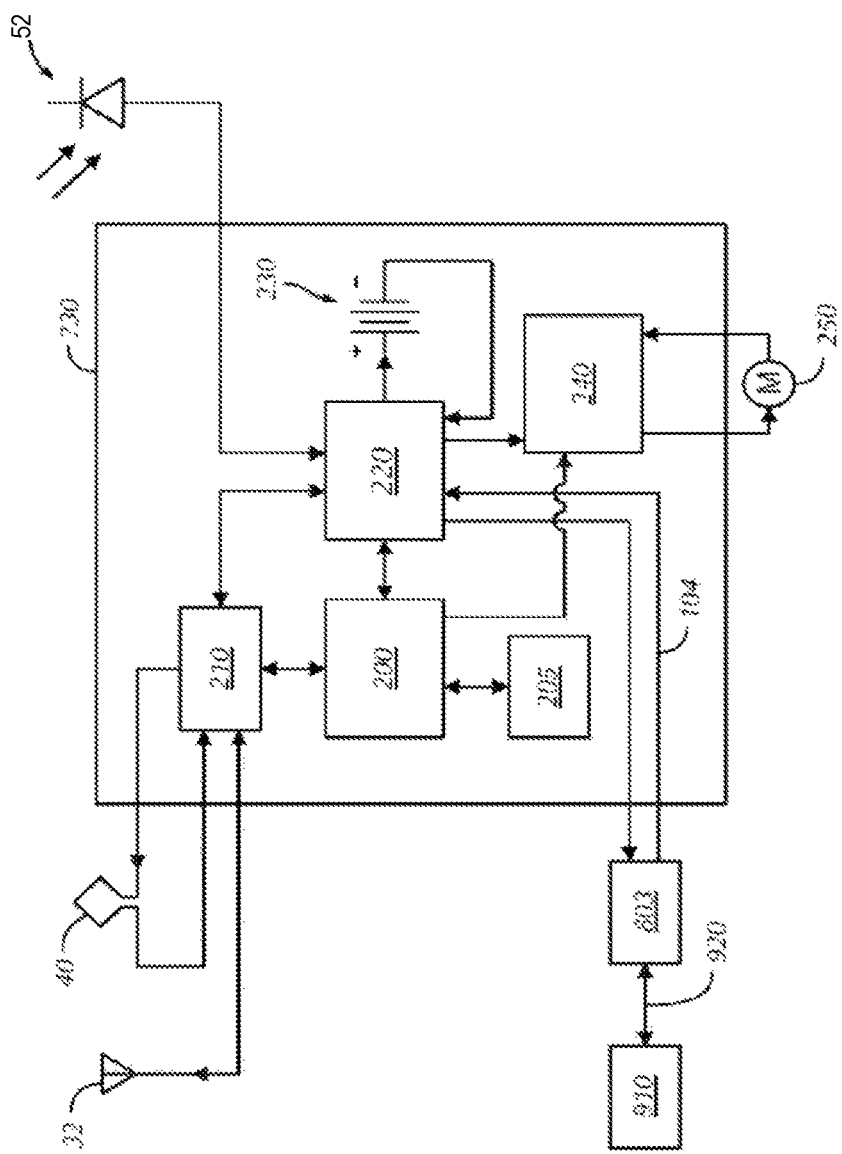
FIG. 11 illustrates a simplified block diagram of the recharging, storage and transmission for control and inductive charging and sharing as well as the PD requirement for power over ethernet.

FIG. 11 illustrates a simple block diagram of the control system 730 that includes a processor 200 connected to memory 205 and one or more RF transceiver(s) 210. FIG. 11 illustrates various types of inductive, rechargeable roller shade and/or screen systems. This embodiment illustrates a rechargeable power supply system that includes a local power storage battery 230 connected to one or more DC charging circuits 220. And motor control circuit 240 connects to a motor 250. This embodiment illustrates a Power over Ethernet (PoE) connection 803 that connects to an Ethernet network 920 and a Power Source Equipment (PSE) 910 through the Ethernet network 920. Another embodiment may include a rectenna inductive 40 to provide power for recharging. And another embodiment may include a nantenna or other solar harvesting circuit 52 for providing power for recharging. Another embodiment allows for excess stored power to be transmitted via RF transceiver 210 out a single or plurality of sub GHz and GHz RF antenna(s) 32 to use as power supplies to other shade and/or screen nodes for inductive recharging. A person of ordinary skill in the art will understand that Power over Ethernet (PoE) is defined as an IEEE 802.3 standard that includes the Alternative A or Alternative B implementations. The person of ordinary skill in the art will also understand that the power is transmitted on the same wire as data and the power is transmitted on the data conductors by applying a common voltage to each pair. Since the twisted-pair Ethernet uses differential signaling, the transmission of power does not interfere with the data transmission. The common-mode voltage is extracted using the center tap of the standard Ethernet pulse transformer. In other words, PoE is another type of inductive power transmission/charging. A person of ordinary skill in the art will understand that the various embodiments of PoE that describe inductive, rechargeable systems include embodiments now known or later developed.

FIG. 12 illustrates a plurality of motorized roller shade and/or screen control system nodes 730a, 730b, through 730n. In this embodiment, control system node 730a includes a rechargeable power supply system that with charging circuit 220 (not shown) is connected to a local power storage battery 230 (not shown) and connected to a one or more DC charging circuits 220 (not shown). Another embodiment may include an inductive rectenna 40 to provide power for recharging. And another embodiment may include an inductive nantenna or other solar harvesting circuit 52 for providing power for recharging. Another embodiment allows for excess stored power to be transmitted via RF transceiver 210 (not shown) out through a single or plurality of sub GHz and GHz RF antenna(s) 32 for use to supply power to other shade and/or screen nodes for inductive recharging. Control system nodes 730b through 730n are similar to the embodiment of control system node 730a. In this embodiment, control system node 730a can provide inductive, RF radiation from antenna 32 to provide power or charge an adjacent node such as control system nodes 730b through 730n for power recharging. A person of ordinary skill in the art will appreciate that one or more nodes in this embodiment can both transmit and receive RF radiation for power recharging between the various nodes.

Figure 13:
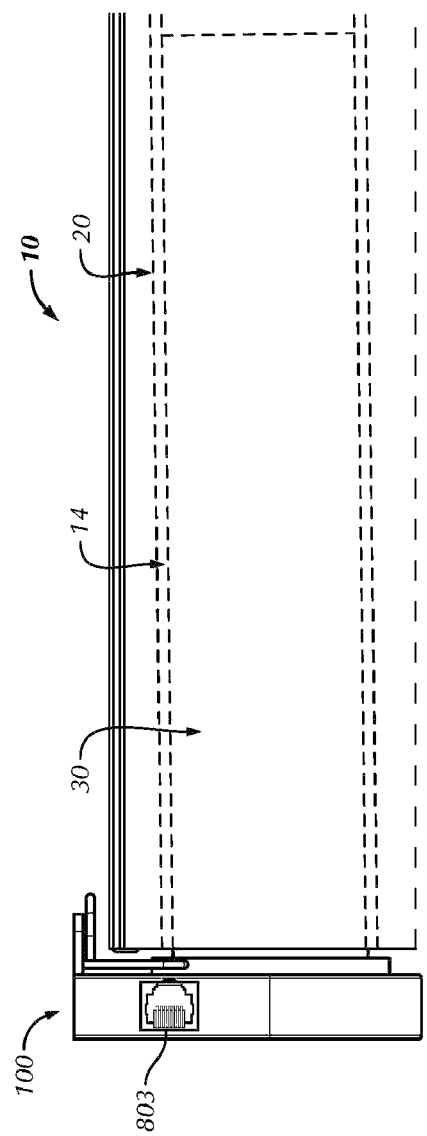
FIG. 13 is a diagrammatic representation depicting one embodiment of a motorized roller system with RJ45 for use with Ethernet type communications to control a system and as a connection to the PD for use as the recharging circuit using PoE.

FIG. 13 illustrates the control system 30 in FIG. 2 that includes the motorized roller system 10 that includes a motorized roller structure that includes a winding tube 14 coupled to panel 20 and a control system 30 for controlling the winding tube 14. The control system 30 can include an actuator, such as a DC motor, coupled to winding tube 14, and includes a rechargeable power supply to power the actuator. End cap mounting assembly 100 couples to control system 30. The end cap mounting assembly 100 includes a RJ45 Ethernet connection 803 that couples to control system 30 to provide a connection for Power over Ethernet (PoE) that provides power to the system for operations and for recharging. One embodiment using PoE would use IEEE Standards such as 802.3at/af/bt/bu/+, or proprietary quasi standards such as Cisco's UPoE, or even a passive PoE with voltage applied without a negotiation. A person of ordinary skill in the art will understand there exists now and in the future a variety of variations implementing PoE. One embodiment, for example, would negotiate for voltage, wattage, class, and dual or single signatures, and could use a single pair, dual pair or all pair for dc voltage including negotiation for polarity on all or any pairs.

Figure 14:
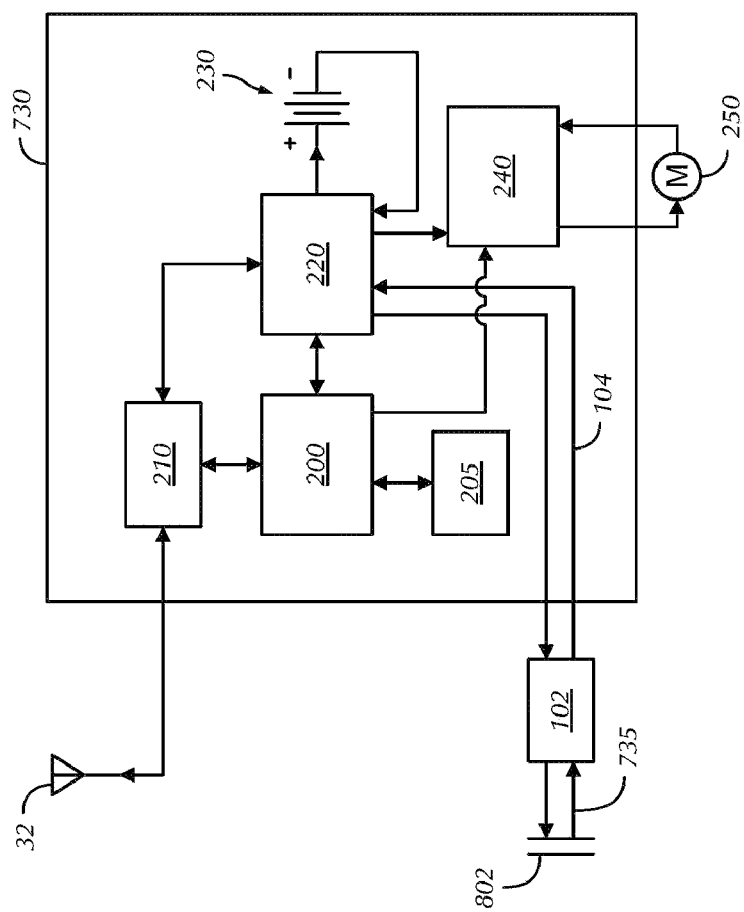
FIG. 14 illustrates a simplified block diagram of one embodiment of the control system with an inductive, magnetic break away recharging system.

FIG. 14 illustrates a simple block diagram of the control system 730 that includes a processor 200 connected to memory 205 and one or more RF transceiver(s) 210. This embodiment illustrates a rechargeable power supply system that includes a local power storage battery 230 connected to one or more DC charging circuits 220. One embodiment includes a magnetic, inductive break away connector 802 to provide power for recharging. One embodiment includes a magnetic, inductive break away connector 802 to provide power for recharging. Magnetic connector 802 couples to magnetic, inductive charging connector 102 through inductive, magnetic connection 735. Recharge connector 102 connects to charging circuit 220 through control system recharge leads 104. And motor control circuit 240 connects to a motor 250. This embodiment provides for commands to be sent to the system 10 received through RF antenna 32 and transceiver 210 where the commands control the operation of the system 10 such raise, lower, and/or stop the rolling/unrolling of the movable panel.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

The invention claimed is:
1. A rechargeable roller panel system comprising:
   a roller panel assembly comprising:
      a winding tube having a first lateral end and a second lateral end, the winding tube rotatable about a lateral axis;
      a movable panel, the movable panel coupled to the winding tube;
      an actuator disposed in and coupled to the winding tube, the actuator adapted to rotate the winding tube to wind and unwind the movable panel;
      a rechargeable power supply inserted in the winding tube at the first lateral end and connected to the actuator to power the actuator, the rechargeable power supply comprising a recharge circuit;
   a recharge system electrical connector electrically connected to the rechargeable power supply;
   an end cap comprising:
      an end wall having an end wall inner surface and an end wall outer surface;
      a side wall portion extending laterally inward from end wall, the side wall portion having a side wall inner surface on an interior side of the side wall portion and a side wall outer surface on an exterior side of the side wall portion, the side wall portion defining a first connector opening from the side wall inner surface to the side wall outer surface;

a first magnetic break-away electrical connector connectable to an external magnetic break-away charging cable, the first magnetic break-away electrical connector at least partially disposed in the first connector opening and exposed from the exterior side; and a first internal electrical connector electrically connected in the end cap to the first magnetic break-away electrical connector and electrically connected to the recharge system electrical connector, the first internal electrical connector and the recharge system electrical connector separable through lateral motion; and a set of brackets to mount the roller panel assembly to the end cap and the end cap to a support structure.

2. The roller panel assembly of claim 1, wherein the side wall portion further defines a second connector opening from the side wall inner surface to the side wall outer surface, and wherein the end cap further comprises a second magnetic break-away electrical connector and a second internal electrical connector, the second magnetic break-away electrical connector at least partially disposed in the second connector opening and exposed from the exterior side, the second magnetic break-away electrical connector electrically connected to the second internal electrical connector, the second internal electrical connection adapted to connect to the recharge system electrical connector.

3. The roller panel assembly of claim 2, wherein the first internal electrical connector is positioned to connect to the recharge system electrical connector when the end cap is in a first orientation and the second internal electrical connector is positioned to connect the recharge system electrical connector when the end cap is in a second orientation.

4. The roller panel assembly of claim 3, wherein the first magnetic break-away electrical connector comprises a first magnetic break-away electrical connector outer face, wherein the second magnetic break-away electrical connector comprises a second magnetic break-away electrical connector outer face, and wherein the first magnetic break-away electrical connector outer face and the second magnetic break-away electrical connector outer face are inset from the outer side wall surface.

5. The roller panel assembly of claim 4, wherein the first magnetic break-away electrical connector outer face and the second magnetic break-away electrical connector each have a central pin for connecting to the external magnetic break-away charging cable.

6. The roller panel assembly of claim 3, wherein the first magnetic break-away electrical connector and the second magnetic break-away electrical connector are adapted to connect to the external magnetic break-away charging cable through connection perpendicular to the lateral axis.

7. The roller panel assembly of claim 6, wherein the first magnetic break-away electrical connector comprises a first magnetic break-away electrical connector outer face, wherein the second magnetic break-away electrical connector comprises a second magnetic break-away electrical connector outer face, wherein the first magnetic break-away electrical connector outer face faces in an opposite direction from the second magnetic break-away electrical connector outer face.

8. The roller panel assembly of claim 7, wherein the first magnetic break-away electrical connector outer face and the second magnetic break-away electrical connector outer face are inset from the outer side wall surface.

9. The roller panel assembly of claim 3, wherein the end cap further comprises:

an internal circuit board electrically connecting the first magnetic break-away electrical connector to the first internal electrical connector and electrically connecting the second magnetic break-away electrical connector to the second internal electrical connector.

10. The roller panel assembly of claim 9, wherein the first internal electrical connector and the second internal electrical connector are pin connectors.

11. The roller panel assembly of claim 9, wherein the internal circuit board is C-shaped.

12. The roller panel assembly of claim 9, wherein the internal circuit board is adjacent to the end wall inner surface.

13. The roller panel assembly of claim 12, further comprising standoffs that space the internal circuit board from the end wall.

14. The roller panel assembly of claim 9, wherein the set of brackets comprises a first mounting bracket, the first mounting bracket comprising:

a base plate portion mountable to the support structure; and a support plate portion that projects into the end cap to support the end cap, and wherein the internal circuit board is located between the support plate portion and the end wall of the end cap.

15. The roller panel assembly of claim 14, wherein the end cap comprises support walls that abut the support plate portion of the first mounting bracket.

16. The roller panel assembly of claim 14, wherein the end cap comprises an end cap bracket that captures the support plate portion in the end cap.

17. The roller panel assembly of claim 16, wherein the support plate portion is positioned between the end cap bracket and the internal circuit board.

18. The roller panel assembly of claim 16, wherein the set of brackets further comprises a second mounting bracket, the second mounting bracket coupled to the roller panel assembly and adapted for mounting the roller panel assembly to the end cap, the second mounting bracket supported by the end cap bracket.

19. The roller panel assembly of claim 18, wherein the end cap bracket comprises a laterally extending projection for supporting the second mounting bracket, and wherein the second mounting bracket defines an opening to receive the laterally extending projection.

20. The roller panel assembly of claim 18, wherein the recharge system electrical connector is located on the second mounting bracket.

21. The roller panel assembly of claim 18, wherein the side wall portion is a peripheral wall, wherein the peripheral wall and the end wall at least partially define an interior area of the end cap, wherein the end cap bracket, the internal circuit board, the first internal electrical connector, and the second internal electrical connector are disposed in the interior area of the end cap, and wherein the support plate portion projects into and is captured in the interior area of the end cap.

22. The roller panel assembly of claim 1, wherein the movable panel is a screen or shade.

23. An end cap assembly for mounting a rechargeable roller panel, the end cap assembly comprising: an end cap, further comprising: an end wall, the end wall having an end wall inner surface and an end wall outer surface;

a side wall portion, the side wall portion extending laterally inward from end wall and having a side wall inner surface on an interior side of the side wall portion and a side wall outer surface on an exterior side of the side wall portion, the side wall portion defining a first connector opening from the side wall inner surface to the side wall outer surface;

a first magnetic break-away electrical connector connectable to an external magnetic break-away charging cable, the first magnetic break-away electrical connector at least partially disposed in the first connector opening and exposed from the exterior side; and a first internal electrical connector electrically connected in the end cap to the first magnetic break-away electrical connector, the first internal electrical connector adapted to connect to a recharge system electrical connector of a rechargeable roller panel assembly through relative lateral motion of the first internal electrical connector and the recharge system electrical connector; and an end cap mounting bracket for mounting the end cap to a support structure and mounting a lateral end of the rechargeable roller panel assembly to the end cap.

24. The end cap assembly of claim 23, wherein the side wall portion further defines a second connector opening from the side wall inner surface to the side wall outer surface, wherein the end cap further comprises a second magnetic break-away electrical connector and a second internal electrical connector, the second magnetic break-away electrical connector at least partially disposed in the second connector opening and exposed from the exterior side, wherein the second magnetic break-away electrical connector is electrically connected in the end cap to the second internal electrical connector, wherein the first internal electrical connector is adapted to connect to the recharge system electrical connector of the rechargeable roller panel assembly when the end cap is in a first mounting orientation and the second internal electrical connection is adapted to connect to the recharge system electrical connector of the rechargeable roller panel assembly when the end cap is in a second mounting orientation.

25. The end cap assembly of claim 24, wherein the first magnetic break-away electrical connector comprises a first magnetic break-away electrical connector outer face, wherein the second magnetic break-away electrical connector comprises a second magnetic break-away electrical connector outer face, and wherein the first magnetic break-away electrical connector outer face and the second magnetic break-away electrical connector outer face are inset from the outer side wall surface and face in opposite directions, and wherein the first magnetic break-away electrical connector and the second magnetic break-away electrical connector are adapted to connect to the external magnetic break-away charging cable through connection perpendicular to a lateral axis of the rechargeable roller panel assembly.

26. The end cap assembly of claim 25, wherein the first magnetic break-away electrical connector outer face and the second magnetic break-away electrical connector each have a central pin for connecting to the external magnetic break-away charging cable.

27. The end cap assembly of claim 25, wherein the end cap mounting bracket comprises:

a base plate portion mountable to the support structure; and a support plate portion insertable into the end cap to support the end cap; and wherein the end cap comprises:

an end cap bracket adapted capture the support plate portion of the end cap mounting bracket, the end cap bracket comprising a laterally extending portion adapted to be inserted into an opening of a roller panel assembly mounting bracket on the rechargeable roller panel assembly; and an internal circuit board electrically connecting the first magnetic break-away electrical connector to the first internal electrical connector and electrically connecting the second magnetic break-away electrical connector to the second internal electrical connector, the internal circuit board located adjacent to an inner surface of the end cap, the internal circuit board positioned to be between the support plate portion and the end wall inner surface when the support plate portion is inserted into the end cap.

* * * * *